July 12, 1938.   A. G. HERRESHOFF   2,123,335
MOTOR VEHICLE
Filed June 5, 1935    3 Sheets-Sheet 1
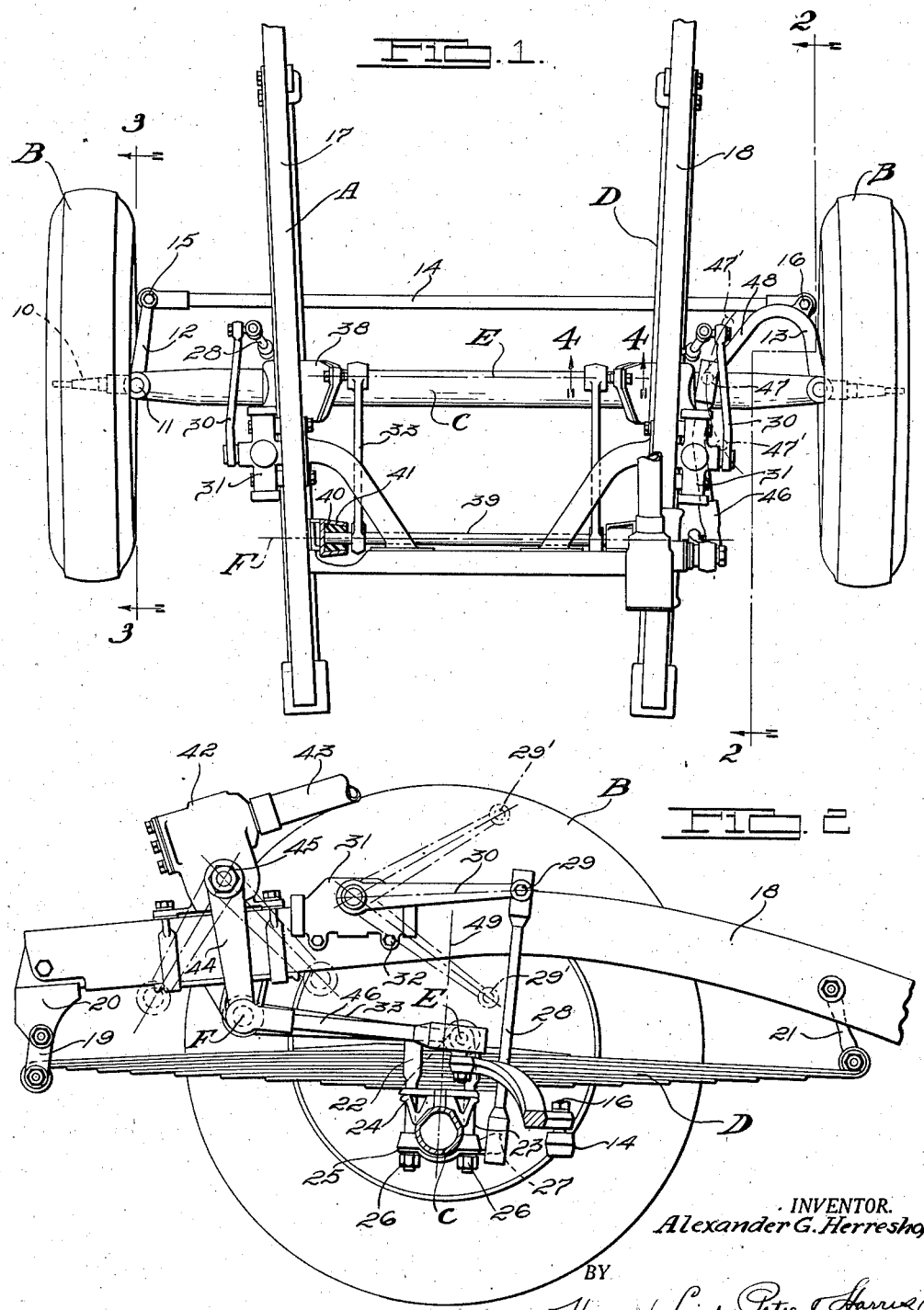
INVENTOR.
Alexander G. Herreshoff
BY
ATTORNEYS

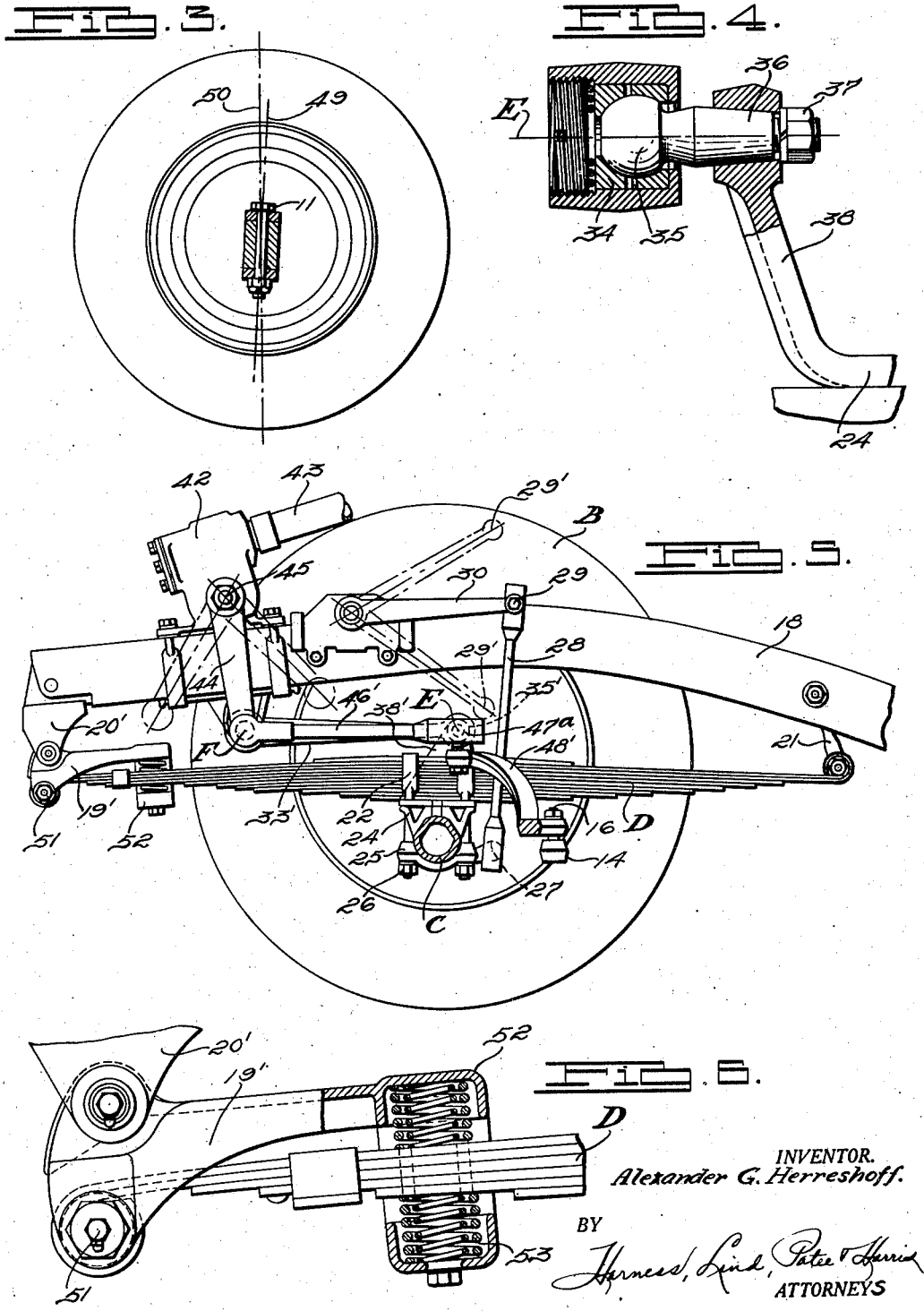

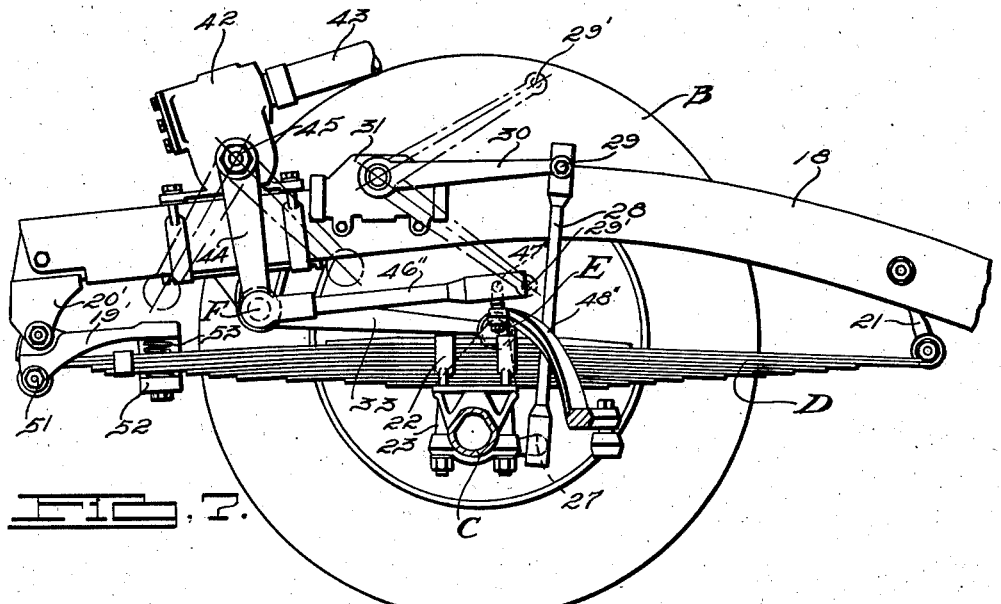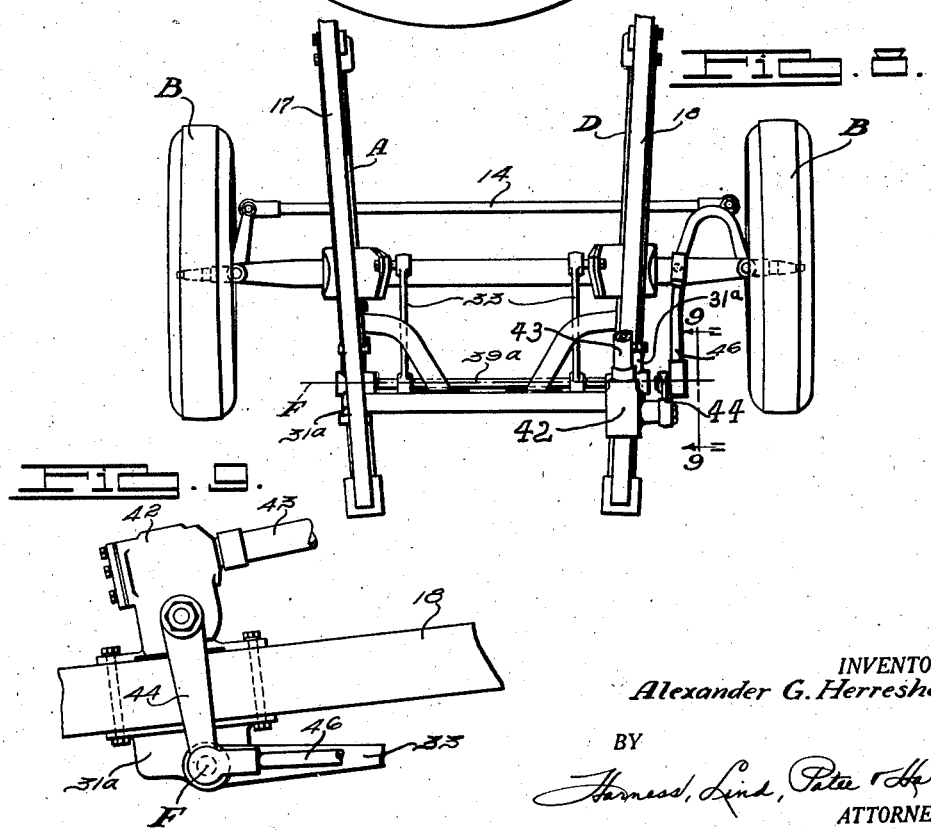

Patented July 12, 1938

2,123,335

UNITED STATES PATENT OFFICE 2,123,335

MOTOR VEHICLE

Alexander G. Herreshoff, Grosse Pointe Village, Mich., assignor to Chrysler Corporation, Highland Park, Mich., a corporation of Delaware Application June 5, 1935, Serial No. 25,072

8 Claims. (Cl. 280—95)

This invention relates to motor vehicles and refers more particularly to improvements in means for mounting the vehicle on the supporting road wheels.

My invention is especially adapted to motor vehicle front steering wheel mountings or suspensions although certain features of my invention may be used to advantage in connection with non-steering wheel suspensions.

Heretofore, in motor vehicles employing brakes on the front steering wheels, the wheels are subjected to objectionable and undesired movements, generally laterally to the left or right when the front axle twists or rotates when the brakes are applied. The axle twist or "roll" as it is generally called is a well known objectionable characteristic of steering wheels and produces an unstable action of the front end of the vehicle often resulting in accidents when the brakes are applied at high vehicle speeds, undue strain on the steering mechanism, tire wear, steering wheel fight, and other undesirable characteristics.

One object of my invention is to overcome the aforesaid objectionable characteristics; to provide a novel arrangement of wheel suspension and steering mechanism substantially free from undesired wheel displacement especially when the brakes are applied; and to provide simple and effective means for rendering the motor vehicle stable in the driving and braking operations thereof.

Another object of my invention is to provide improved means for stabilizing the vehicle, preferably by stabilizing the front axle through the use of frame connected means in addition to the supporting springs. This frame connecting means is preferably in the form of radius rods near each end of the axle.

A further object of my invention is to provide improved means for minimizing side sway of the vehicle body when turning or rounding a curve, such means preferably comprising a stabilizer bar tending to maintain the vehicle body against lateral tilt.

An additional object of my invention resides in an improved arrangement of the aforesaid means whereby the radius rods are employed as the stabilizer bar actuators, the radius rods cooperating with the wheel axle and steering mechanism to prevent the aforesaid objectionable wheel displacements when the brakes are applied.

Another object of my invention resides in the provision of an improved vehicle stabilizing and steering arrangement adapted to a wide variety of installations in motor vehicles.

A further object of my invention resides in a novel arrangement of shock absorber and radius rods whereby the latter are employed to actuate the shock absorbers, preferably through a torque stabilizer bar pivoting the radius rods.

Further objects and advantages of my invention reside in the novel combination and arrangement of parts more particularly hereinafter described and claimed, reference being had to the accompanying drawings which illustrate one embodiment of my invention and in which:

Fig. 1 is a top plan view of the front end of a motor vehicle showing my invention applied thereto.

Fig. 2 is a sectional elevational view taken as indicated by the line 2—2 of Fig. 1.

Fig. 3 is a sectional elevational view along line 3—3 of Fig. 1 illustrating one of the vehicle steering wheels.

Fig. 4 is an enlarged sectional view of the rear pivotal support for one of the radius rods, the view being taken along line 4—4 of Fig. 1.

Fig. 5 is a view generally similar to Fig. 2 but illustrating a modified arrangement of parts.

Fig. 6 is an enlarged view of the spring controlling device illustrated in Fig. 5.

Fig. 7 is a view similar to Figs. 2 and 5 but illustrating a slightly further modified arrangement of certain parts.

Fig. 8 is a view on a reduced scale similar to Fig. 1 but illustrating a modified construction of shock absorber assembly.

Fig. 9 is a detail elevational view taken as indicated by line 9—9 of Fig. 8.

Referring to the drawings, I have illustrated my invention in connection with a motor vehicle of the well known type wherein the front axle supports the front end of the frame structure by a pair of longitudinally extending leaf spring assemblies. The vehicle frame structure is generally indicated by reference character A and may be of any desired type for carrying the well known body structure (not shown). The steerable vehicle supporting front ground wheels B are rotatably mounted on the spindles 10 swivelly supported by king pins 11 respectively carried at the outer ends of the front axle C.

In order to impart steering movement to the wheels B about the axes of the respective king pins 11, the spindles 10 are provided with steering knuckle arms 12 and 13 respectively, these arms being interconnected by a tie rod 14. This tie rod is articulated at 15 and 16 to the arms 12 and 13 respectively whereby the steering wheels are swivelled in unison about their respective king pins as will be more apparent hereinafter.

The axle C extends transversely below the longitudinal side rails 17 and 18 of frame structure A, the axle being yieldingly connected to the side rails for supporting the front end of the motor vehicle by reason of the similar leaf spring assemblies D. Each spring assembly, as best shown in Fig. 2, is swingingly connected by a shackle 19 to a bracket 20 secured to the front end of one of the frame side rails, while the rear end is swingingly connected by a shackle 21 depending from an intermediate portion of the side rails.

Each spring assembly D is rigidly connected to axle C by the U-bolts 22, 23, a bracket assembly 24 serving to seat the spring assembly on the axle while a second bracket assembly 25 is located beneath the axle to provide an abutment for the nuts 26 threaded on the lower ends of the U-bolts for clamping the assembly together.

Each bracket assembly 25 has a rearward projection which, in the illustrated embodiment of the invention, provides a ball and socket articulated connection 27 with the lower end of a drag link 28, the upper end of which is articulated at 29 to the operating arm 30 of a hydraulic shock absorber 31 bolted at 32 to the side rail 18, it being understood that a similar shock absorbing connection is provided between the side rail 17 and the connection between the front axle and the other spring assembly.

In order to stabilize the axle C when subjected to braking torque and road shocks, I have provided stabilizing means interconnecting the frame structure with the axle preferably at the points of connection between the axle and the spring assemblies D, this stabilizing means comprising a pair of similar radius rods 33 which, in the illustrated arrangement of the steering mechanism extend forwardly from the axle.

It is customary to provide brakes for the front wheels B of motor vehicles and such brakes may be of any well known construction not illustrated in my drawings. When these brakes are applied, the front axle C tends to roll under the influence of the braking torque and it has been determined that the point or center of rotation of the axle and spring assemblies usually lies approximately at the top leaf of the spring assembly or a little thereabove, this point being indicated at E in Fig. 2.

In Fig. 1 E represents the transverse axis about which the axle C tends to roll under the influence of braking torque applied to the front steering wheels B. The swinging ends of the radius rods 33 are articulated along this axis by a connection with the axle. To this end the swinging end of each radius rod 33 is provided with a socket 34 receiving a ball 35 carried by a pin 36 (see Fig. 4) rigidly secured by a fastener 37 to the upwardly projecting end 38 of one of the members of the aforesaid bracket assembly 24.

The other ends of the radius rods 33 are supported from the frame structure for movement about a common axis indicated at F. As a feature of my invention, in its more limited aspects, the ends of the radius rods are interconnected preferably along the axis F by an anti-sway or stabilizer torque bar 39.

The forward ends of radius rods 33 are rigidly secured to the stabilizer bar 39, the outer ends of the stabilizer bar being journaled preferably in rubber bushings 40 carried by housings 41 rigidly secured to the frame structure. The end portions of the axle C are thus interconnected through the radius rods 33 and stabilizer bar 39 whereby the vehicle body tends to maintain a substantially even keel when the vehicle is rounding a curve or when one of the steering wheels rises or falls to a greater extent than the other. It will furthermore be noted that by reason of my invention I am enabled to use the radius rods 33 also as the actuating arms of the stabilizer bar 39. The pivotal axes E and F for the ends of the radius rods 33 are so arranged that they cooperate in a novel manner with the steering mechanism whereby undesired movements of the steering wheels are avoided when the wheels are subjected to braking torque or when they encounter obstructions in the road way as will be presently more apparent.

The steering reduction gearing, of any well known suitable construction, is contained in the housing 42 adapted for operation through the usual steering post 43 which, as usual, extends for convenient operation by the vehicle driver. The steering gear arm or pitman arm 44 is swingingly operated about the pivot 45 when operated by the steering gear 42 for imparting the desired steering movement to the wheels B. In the drawings the parts illustrated in solid lines represent the normal positions of the wheels and steering mechanism for straight ahead vehicle travel. At such time the axis of pivotal connection between the lower end of pitman arm 44 and the steering mechanism or drag link 46 operated thereby is arranged so that it is coincident with the aforesaid axis F about which the ends of radius rods 33 have pivotal support with the frame structure of the vehicle. The opposite or rear end of drag link 46 has an articulated or ball and socket connection 47 with the return bent end 48 of the aforesaid steering knuckle arm 13 as best illustrated in Fig. 1. During the normal position of the parts the aforesaid axis E passes through the point of connection 47, it being apparent that with such an arrangement any steering tendency is avoided during the application of a braking torque to the steering wheels or when the latter are subjected to rising and falling movements. In Fig. 3 I have illustrated the king pins inclined along an axis 49 lying at the usual relatively small angle with the vertical axis indicated at 50, this angle being designated as the caster angle and is well understood in steering geometry. The extreme positions of movement of the pivotal connection 29 as the axle C moves with respect to side rail 18 are indicated at 29', likewise extreme steering positions of the pitman arm 44 are illustrated in dotted lines in Fig. 2, while in Fig. 1 I have illustrated at 47' the extreme positions of swinging movement of the pivotal connection 47 about the king pin 11.

Inasmuch as I have provided the radius rods 33 for stabilizing the axle C, it is possible to provide swinging shackles 19 and 21 respectively at the front and rear ends of each of the spring assemblies D, these radius rods preferably being arranged as illustrated in the drawings so that when the vehicle is travelling forwardly and the wheels strike a rut in the roadway the wheels will be guided by the radius rods upwardly and rearwardly swinging about the axis F away from the rut rather than toward the same.

I have furthermore prevented any tendency toward objectionable displacement toward the steering wheels including so-called "wheel fight" during the application of braking torque or when the wheels are subjected to road shocks, since the axes E and F containing the pivots at the opposite end of the radius rods 33 also are the axes respectively of pivotal connection at the opposite ends of drag link 46 with the steering knuckle arm 13 and pitman arm 44, the axis E further preferably containing that axis or point about which the axle tends to roll under the influence of braking torque applied to the steering wheels. The wheels are therefore free to rise and fall without changing their straight ahead steering positions and they may also have a rolling action about the axis E likewise without tendency to impart steering movements to the wheels.

Referring now to Figs. 5 and 6 I have illustrated a modified arrangement of certain of the parts to provide the desired stability at the front end of the motor vehicle where it is not desired to locate the pivotal connections between the drag link and steering knuckle arm and between the radius rods and the axle on a common axis containing the axis about which the axle tends to roll under the influence of braking torque. It sometimes occurs in motor vehicle installations that, by reason of other parts of the motor vehicle, it is necessary or desirable to raise or lower the aforesaid pivotal axis with respect to the axis of rolling of the axle. In Fig. 5 for example it will be noted that I have illustrated such a condition wherein this pivotal axis is located above the axis of roll of the axle and therefore above the corresponding position illustrated in Fig. 2 wherein these axes were coincident at E.

In Fig. 5 most of the reference numerals are identical to those hereinbefore referred to since such parts are illustrative of the same construction, arrangement and operation. However, in Fig. 5 the bracket 38' is extended higher than the bracket 38 of Fig. 2 whereby to position the axis E' above the axis of roll of the axle, it being understood that the axis E' contains the pivotal connection 47' between the rear end of the drag link 46' and the return bent end 48' of the steering knuckle arm and also the pivotal connection between the radius rods 33' and the axle C, the latter pivotal connection being indicated by the ball 35'.

The only difference in the operation of the Fig. 5 structure over that hereinbefore described in connection with the Fig. 2 arrangement resides in the fact that when the axle tends to roll under the influence of braking torque, a moment is introduced by reason of the separation of the axes E' and the axis of roll of the axle. While this separation of these axes does not alter the aforesaid desirable action in preventing tendencies toward undesired steering movements of the wheels, such separation of the axes tends to buckle the spring assemblies. In other words it will be noted that in the Fig. 2 arrangement the pull on the radius rods 33 when the axle tends to roll under the influence of braking torque, is directly along the length of the radius rods whereas in the Fig. 5 arrangement this pull is no longer directly along the line of the radius rods 33 inasmuch as a couple is introduced, the magnitude of the couple depending upon the distance of separation between the axis E' and the axis of roll of the axle which was indicated at E in Fig. 2.

Such an arrangement tends to bow a portion of the spring assembly D forwardly of the axle in a downward direction while the rear portion of the spring assembly tends to be deflected or bowed upwardly.

In order to stabilize the spring assembly D in the Fig. 5 embodiment of my invention and to prevent undue spring buckling, I preferably provide spring stabilizing means which may be in the form of a "kick shackle" associated with each end of the spring assembly although preferably a stabilizing device of this character when associated with only one end such as the front end of the spring assembly is found to be adequate for practical purposes. While any suitable form of stabilizing device may be used, I have illustrated an arrangement wherein the forward end of each side rail, such as the side rail 18 illustrated in Fig. 5, is provided with a supporting bracket 20', a shackle bracket 19' having pivotal connection at 51 with the forward end of the spring assembly. The bracket 19' extends rearwardly to provide a spring housing 52 portions of which lie on opposite sides vertically of the spring assembly. A plurality of coil springs 53 act between housing 52 and the spring assembly, the arrangement being such that while the end of the spring is shackled from the side rail, buckling of the spring is yieldingly opposed by springs 53 acting on the spring assembly D an appreciable distance from the pivotal point 51 of the spring assembly. In this manner it is possible to permit raising or lowering of the location of the drag link ball 47 from the position illustrated in Fig. 2 while at the same time compensating for buckling tendency in the spring assemblies.

Referring now to Fig. 7, I have illustrated a further modified arrangement illustrating my invention in conjunction with a steering arm pivot which is not located at the axis of axle roll and further which is not on a transverse axis coincident with the axis containing the radius rod pivotal connections with the axle. Since most of the parts are identical in structure and function to those illustrated and described in Fig. 2, I have used many similar reference characters.

In Fig. 7 the drag link 46" is pivotally connected at 47" with the steering knuckle arm 48" at a point spaced from axis E common to the radius rod torque bar pivots and point of axle roll. The kick shackle 19' of Fig. 5 is employed at either or both ends of spring assembly D.

On application of braking torque, axle C tends to roll about axis E counterclockwise as viewed in Fig. 7, tending to bow the spring D as described in Fig. 5. Such action tends to move the pivot 47" forward, thus introducing wheel fight at the steering wheel and wheel shimmy at the ground wheels. By preventing spring D from bowing and maintaining it straighter than otherwise (it being desired to employ relatively flexible spring assemblies), I thereby oppose undue axle roll and accompanying movement of pivot 47". The kick shackle 19' serves this purpose. At the same time undesired steering is prevented when wheels B are displaced by reason of axis F being coincident with the pivots of the radius rods on the frame and the operating end of the pitman arm 44 as before.

Referring to Figs. 8 and 9 I have illustrated a further modification of my invention wherein the radius rods are employed to actuate the shock absorbers. Further, the shock absorbers may be interconnected by the torque stabilizing bar, the latter being operated by the radius rods. This form of my invention may be readily adapted to the arrangements of Figs. 2, 5 or 7.

In Figs. 8 and 9 the arrangement of parts, except for the shock absorbers, is shown identical to the arrangement in Figs. 1 to 4 as indicated by the same reference numerals. However, instead of employing the added linkage 27, 28, 29 and 30 of Fig. 2, I mount the shock absorbers 31ª on frame rails 17, 18 and preferably therebelow as shown in Fig. 9 so that the usual oscillatory operating shaft of each shock absorber has its axis common to the axis F aforesaid. The shock absorbers are preferably operated by interconnection with the torque stabilizer 39ª to effect a further saving of linkage parts although the shock absorbers may, if desired, be otherwise operably connected to the radius rods 33.

What I claim is:

1. In a motor vehicle, a frame structure, a steering ground wheel at each side of the vehicle, an axle mounting said wheels, springs yieldingly supporting said frame from said axle, radius rods extending generally longitudinally of the vehicle, steering gear including a swinging pitman arm, a link pivotally connected at one end thereof to said pitman arm, a steering knuckle arm for one of said wheels pivotally connected to the other end of said link, a steering knuckle arm for the other of said wheels, means for imparting steering movement to the last said steering knuckle arm in response to steering movement of the first said steering knuckle arm, means for pivotally connecting one end of said radius rods with said axle for pivotal movement on an axis substantially containing the point of pivotal connection between said link and the first said steering knuckle arm, and means for pivotally supporting the other ends of said radius rods from said frame structure, said radius rod supporting means comprising a stabilizer bar extending transversely of the vehicle between the last said ends of said radius rods.

2. In a motor vehicle, a frame structure, a steering ground wheel at each side of the vehicle, an axle mounting said wheels, springs yieldingly supporting said frame from said axle, radius rods extending generally longitudinally of the vehicle, steering gear including a swinging pitman arm, a link pivotally connected at one end thereof to said pitman arm, a steering knuckle arm for one of said wheels pivotally connected to the other end of said link, a steering knuckle arm for the other of said wheels, means for imparting steering movement to the last said steering knuckle arm in response to steering movement of the first said steering knuckle arm, means for pivotally connecting one end of said radius rods with said axle for pivotal movement on an axis substantially containing the point of pivotal connection between said link and the first said steering knuckle arm, means for pivotally supporting the other ends of said radius rods from said frame structure, and vehicle stabilizing means extending transversely of said vehicle for operation by said radius rods.

3. In a motor vehicle, a frame structure, a steering ground wheel at each side of the vehicle, an axle mounting said wheels, springs yieldingly supporting said frame from said axle, radius rods extending generally longitudinally of the vehicle, steering gear including a swinging pitman arm, a link pivotally connected at one end thereof to said pitman arm, a steering knuckle arm for one of said wheels pivotally connected to the other end of said link, a steering knuckle arm for the other of said wheels, means for imparting steering movement to the last said steering knuckle arm in response to steering movement of the first said steering knuckle arm, means for pivotally connecting one end of said radius rods with said axle for pivotal movement on an axis substantially containing the point of pivotal connection between said link and the first said steering knuckle arm, means for pivotally supporting the other ends of said radius rods from said frame structure, said axis being spaced from the axis of roll of said axle when the latter is subjected to braking torque at said wheels, and means acting on said springs for opposing buckling tendency therein incident to the spacing of said axes.

4. In a motor vehicle, a frame structure, a steering ground wheel at each side of the vehicle, an axle mounting said wheels, springs yieldingly supporting said frame from said axle, radius rods extending generally longitudinally of the vehicle, steering gear including a swinging pitman arm, a link pivotally connected at one end thereof to said pitman arm, a steering knuckle arm for one of said wheels pivotally connected to the other end of said link, a steering knuckle arm for the other of said wheels, means for imparting steering movement to the last said steering knuckle arm in response to steering movement of the first said steering knuckle arm, means for pivotally connecting one end of said radius rods with said axle for pivotal movement on an axis substantially containing the point of pivotal connection between said link and the first said steering knuckle arm, and means including a torque bar extending transversely of the vehicle for pivotally supporting the other ends of said radius rods from said frame structure for pivotal movement on an axis substantially containing the point of pivotal connection between said pitman arm and said link.

5. In a motor vehicle, a pair of dirigible road wheels, an axle between the wheels, means for yieldingly supporting the vehicle on the axle, means for guiding rising and falling movements of said axle including a rod pivotally supported by the vehicle, means pivotally connecting said rod to said axle, means for imparting steering movements to said wheels including pivotally connected steering force transmitting elements, the points of said pivotal connections lying substantially along a common axis spaced from the axis of roll of said axle when the wheels are positioned for straight ahead vehicle travel, and means acting on said yielding supporting means for opposing buckling tendency therein incident to the spacing of said axes.

6. In a motor vehicle, a frame structure, a steering ground wheel at each side of the vehicle, an axle mounting said wheels, springs yieldingly supporting said frame from said axle, radius rods extending generally longitudinally of the vehicle, steering gear including a swinging pitman arm, a link pivotally connected at one end thereof to said pitman arm, a steering knuckle arm for one of said wheels pivotally connected to the other end of said link, a steering knuckle arm for the other of said wheels, means for imparting steering movement to the last said steering knuckle arm in response to steering movement of the first said steering knuckle arm, means for pivotally connecting one end of said radius rods with said axle for pivotal movement on an axis substantially containing the axis of roll of the axle when the latter is subjected to braking torque and spaced from the point of pivotal connection between said link and the first said steering knuckle arm, means for pivotally supporting the other ends of said radius rods from said frame structure, said radius rod pivotal axis being spaced from the axis of roll of said axle, and means acting on said springs for opposing buckling tendency therein incident to the spacing of said axes.

7. In a motor vehicle, a frame structure, a steering ground wheel at each side of the vehicle, an axle mounting said wheels, springs yieldingly supporting said frame from said axle, radius rods extending generally longitudinally of the vehicle, steering gear including a swinging pitman arm, a link pivotally connected at one end thereof to said pitman arm, a steering knuckle arm for one of said wheels pivotally connected to the other end of said link, a steering knuckle arm for the other of said wheels, means for imparting steering movement to the last said steering knuckle arm in response to steering movement of the first said steering knuckle arm, means for pivotally connecting one end of said radius rods with said axle, and means comprising a transversely extending stabilizing bar journaled in said frame structure and secured to the other ends of said rods for supporting the latter for pivotal movement on an axis substantially containing the point of pivotal connection between said pitman arm and said link.

8. In a motor vehicle, a frame structure, a steering ground wheel at each side of the vehicle, an axle mounting said wheels, springs yieldably supporting said frame from said axle, radius rods extending generally longitudinally of the vehicle, steering gear including a swinging pitman arm, a link pivotally connected at one end thereof to said pitman arm, a steering knuckle arm for one of said wheels pivotally connected to the other end of said link, a steering knuckle arm for the other of said wheels, means for imparting steering movement to the last said steering knuckle arm in response to steering movement of the first said steering knuckle arm, shock absorbing means mounted on said frame structure, means for pivotally connecting one end of said radius rods with said axle, and means comprising a transversely extending stabilizing bar secured to the other ends of said rods for pivotally supporting the latter from said frame structure for pivotal movement on an axis substantially containing the point of pivotal connection between said pitman arm and said link, said stabilizing bar forming an operating connection between said shock absorbing means and said radius rods.

ALEXANDER G. HERRESHOFF.